Patented Aug. 19, 1952

2,607,805

UNITED STATES PATENT OFFICE 2,607,805

HYDROGENATION OF GLYCOLIC ACID TO ETHYLENE GLYCOL

William F. Gresham, Wilmington, Del., assignor to E. I. du Pont de Nemours and Company, Wilmington, Del., a corporation of Delaware No Drawing. Application June 10, 1949, Serial No. 98,408

6 Claims. (Cl. 260—635)

This invention relates to a process for the hydrogenation of hydroxy-substituted carboxylic acids and more particularly to the direct hydrogenation of glycolic acid to ethylene glycol.

The conversion of hydroxy carboxylic acids to polyhydric alcohols has been restricted because of the tendency of these acids, in the pure state and at elevated temperatures and pressures, to give anhydrides, internal esters and polymers by the reaction of the hydroxyl and/or carboxyl group of one molecule with the carboxyl and/or hydroxyl group of another or by the reaction of the hydroxyl group of such a compound with its own carboxyl group. In the case of glycolic acid, for example, self-esterification to give polyglycolide, $HO(CH_2COO)_nH$, and di-glycolide,

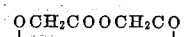

may take place or hydroxyacetic acid anhydride may be formed and the free hydroxyl groups of the latter may subsequently be esterified by the carboxyl groups of hydroxyacetic acid. These and other polymerizable and non-polymerizable products, which are invariably present with this polyfunctional compound, should be removed prior to hydrogenation of the acid for they interfere with economical conversion of the acid by hydrogenation or other more circuitous routes to the polyhydric alcohols heretofore employed. Moreover, processes of the art that only partially convert glycolic acid to ethylene glycol, leaving unconverted glycolic acid in the crude product, are of no practical utility because of the difficulty and expense of separating the acid from the ethylene glycol.

Expedients have been tried to avoid by-product formation of these easily polymerized compounds. In the Loder Patent 2,285,448, issued June 9, 1942, for example, glycolic acid is freed from glycolides, internal esters and polymeric derivatives of glycolic acid, the acid esterified with methanol, the methyl ester separated from the residual products and the ester hydrogenated to the alcohol. This process, involving the conversion of the highly reactive polyfunctional compound to a much less reactive compound and later hydrogenating the latter, made it possible to produce ethylene glycol with greatly reduced by-product formation. Nevertheless, such a process involves an esterification step and losses that occur during that step.

An object of the present invention is to provide an efficient process for the direct hydrogenation of hydroxy carboxylic acids to polyhydric alcohols. Another object of the invention is to provide a process for the direct hydrogenation of hydroxy carboxylic acids to polyhydric alcohols by the use of a catalyst that gives substantially complete conversion of the hydroxy carboxylic acids. Yet another object is to provide a process for the direct hydrogenation of glycolic acid with substantially 100% conversion of glycolic acid. Yet another object is to provide hydrogenation catalysts for the reaction. Other objects and advantages of the invention will hereinafter appear.

The above and other objects of the invention are accomplished by the hydrogenation of a hydroxy carboxylic acid and more particularly glycolic acid in the liquid phase, at temperatures between 125 and 180° C. and under pressures in excess of atmospheric, the reaction being conducted in the presence of ruthenium, and especially a supported ruthenium catalyst. By the use of ruthenium as the catalyst a number of unpredictable results are obtained. The conversion of glycolic acid is substantially quantitative thereby eliminating the difficult and costly separation steps which are necessary if the ethylene glycol crude reaction product contains unreacted glycolic acid. The use of this catalyst may be compared with a copper chromite catalyst for example which, at about 250° C., will hydrogenate glycolic acid to ethylene glycol giving only a 33% conversion of the glycolic acid. There remains in the crude product from the chromite catalyst hydrogenation considerable quantities of glycolic acid.

The use of ruthenium as the catalyst likewise permits the use of crude, unpurified glycolic acid as the feed. The crude acid products from the treatment of formaldehyde, carbon monoxide and water, as described in Loder Patent 2,152,852, need not be purified for the removal of polymers and other by-products of the reaction prior to hydrogenation with this catalyst. On the contrary, the well known acid hydrogenation catalysts require meticulous and expensive purification of the glycolic acid prior to its hydrogenation which greatly increases the advantage of ruthenium over the heretofore used hydrogenation catalysts for this purpose.

A further outstanding advantage of the process of this invention lies in the low temperature at which ruthenium will effect the hydrogenation of glycolic acid. Temperatures between 125 and 180° C. are wholly satisfactory in contrast to the use of chromite catalysts which require, for efficient operation, temperatures in the neighborhood of 250° C. or higher. Inasmuch as glycolic acid condenses with itself to form polymers and internal esters more rapidly at high temperatures, it follows that a low temperature process reduces the formation of such by-products. Only with ruthenium can such low temperatures be successfully and economically employed.

A further advantage of ruthenium as a catalyst for the reaction lies in the high rate of the reaction when this catalyst is used. Even though the temperature is considerably lower than the temperature required for hydrogenation of acids generally, the rate is high, permitting the reaction to take place in as short a time as 10 minutes in contrast to 60 minutes or more for copper chromite catalysts.

Various methods may be used for carrying out the hydrogenation reaction. For example, the hydroxy carboxylic acid, together with the ruthenium catalyst and a diluent such as water, which may be present to the extent of 50 to 90% by weight, may be placed in an autoclave provided with adequate stirring means and hydrogen pumped in to give the desired elevated pressure. The autoclave is then heated to the optimum temperature for the reaction for hydrogenating the hydroxy carboxylic acid and the reaction continued with stirring until hydrogen absorption has substantially ceased. It has been found that when the reaction is conducted in this manner with glycolic acid as the hydroxy carboxylic acid being hydrogenated, a temperature between 125 and 190° C., preferably between 140–160° C., and a pressure above 50 atmospheres will result in a substantially complete conversion of the glycolic acid, there being produced during the hydrogenation no by-products that cannot be readily and inexpensively removed from the reaction mixture.

Various other methods, however, may be employed for conducting the reaction, for example, it may be carried out in an elongated conversion chamber charged with a ruthenium catalyst deposited on a suitable catalyst support such as silica gel, kieselguhr, silicon carbide, Al₂O₃, infusorial earth and the like; the glycolic acid or other hydroxy carboxylic acid and hydrogen are passed through the converter in direct contact with the catalyst, the catalyst and reactants being maintained at the desired temperature, the hydrogen being preferably introduced under sufficient pressure to raise the total pressure within the chamber to operation pressures.

As has been stated, glycolic acid, and the other hydroxy carboxylic acids, are prone to polymerize and otherwise react to form compounds which not only result in an effective loss of the acid but also result in a reaction mixture containing these by-products which are difficult and sometimes impossible to separate completely from the reaction products. There are two sources of these contaminating products. The first, spontaneous formation when the hydroxy carboxylic acid is stored for any length of time prior to its direct hydrogenation, second, induced formation during hydrogenation. Contamination resulting from the first source can be minimized by storing the glycolic acid under low temperature conditions; anti-polymerizing agents may also be used. Contamination from the second source can be minimized by conducting the hydrogenation under low temperatures and at such a rapid rate that there is little time for the formation of the aforesaid contaminants. For this reason, a minimum hydrogenation temperature should be employed, say below 160° C. and preferably below 150° C. and the time of reaction, plus the time the hydroxy carboxylic acid is at reaction temperature, should be shortened as much as possible.

The invention is illustrated by the examples in which parts are by weight unless otherwise indicated.

*Example 1.*—Ethylene glycol was produced with substantially complete conversion of glycolic acid and an 83% yield of ethylene glycol by charging 20 parts of glycolic acid, 80 parts of water and 5 parts of a water-washed ruthenium dioxide into a pressure resisting silver lined shaker tube. This mixture was hydrogenated at temperatures between 145 and 149° C. under pressure of 700–775 atmospheres for 10 minutes. Upon distillation of the filtered product only ethylene glycol (13.6 parts) and water were recovered.

*Example 2.*—The process of Example 1 was repeated except that the catalyst was not first water washed and in this case there was a substantially 100% conversion with an 80% yield of ethylene glycol. The product boiled at 82–86° C. at 5.5–6 mm. Hg.

*Example 3.*—A substantially complete conversion at 80% yield was realized in a reaction in which 20 parts of glycolic acid, 80 parts of water and 10 parts of a 10% ruthenium on carbon catalyst was used. The acid was hydrogenated at a temperature between 145 and 150° C. under pressure of 650–710 atmospheres for about one hour. The product was recovered by distillation and substantially no internal esters or glycolides were formed during the process.

*Example 4.*—20 parts of commercially available technical grade 70% glycolic acid, produced in accord with the Loder process supra, 80 parts of water and 5 parts of ruthenium dioxide (which was not water washed) were subjected to a hydrogenation pressure of 750 to 770 atmospheres under a temperature between 145 and 167° C. for 10 minutes. Substantially no residue was obtained, the glycolic acid being substantially 100% converted with a 69% yield of ethylene glycol. The ethylene glycol produced melted at $-14.5°$ C. and had a refractive index of 1.4303 at 25° C. after a single distillation through a Vigreux column.

*Example 5.*—A mixture of 20 parts of glycolic acid, 80 parts of water, and 10 parts of 10% ruthenium on carbon catalyst was processed at 130–139° C. for one hour at 690–740 atmospheres' hydrogen pressure. On workup, the product gave 11 parts of ethylene glycol (67.4% yield) and no distillation residue.

*Example 6.*—20 parts of glycolic acid, 80 parts of water, and 3 parts of a 10% paladium on carbon catalyst were processed at 149 to 157° C. for one hour at a hydrogen pressure between 675 and 690 atmospheres. The product was filtered and distilled giving 7.5 parts of a residue but no ethylene glycol.

*Example 7.*—The reaction of Example 6 was repeated in all essential details except that 3 parts of a 10% platinum on carbon catalyst was used in place of the palladium catalyst of that example. In this process also, no ethylene glycol was found but there was formed during the reaction 12.7 parts of distillation residue.

*Example 8.*—The reaction of Example 7 was repeated in all essential details except that the temperature was increased to 249 to 255° C. In this instance no ethylene glycol was produced.

Examples 6, 7, and 8 illustrate by contrast the unusual and superior activity of ruthenium when compared with palladium or platinum which are also noble metals and which ordinarily, because of their close relationship to ruthenium, would be considered as possible equivalents. The conclusion is inescapable from the teachings of these examples that platinum and palladium are quite unsuitable and while they have the property of corrosion resistance, an essential property for a catalyst to be used in the hydrogenation of glycolic acid, nevertheless they wholly lack the ability of ruthenium to hydrogenate this acid in substantially quantitative conversion and with the formation of practically no unconverted by-products.

I claim:

1. In a process for the hydrogenation of glycolic acid to ethylene glycol in which a substantially quantitative conversion of glycolic acid is obtained, the step which comprises hydrogenating the glycolic acid while in direct contact with ruthenium as the hydrogenation catalyst at a temperature between 125 and 180° C. and under a pressure in excess of atmospheric pressure.

2. In a process for the hydrogenation of glycolic acid to ethylene glycol in which a substantially quantitative conversion of glycolic acid is obtained, the step which comprises hydrogenating the glycolic acid while in direct contact with ruthenium as the hydrogenation catalyst at a temperature between 140 to 160° C. and under a pressure in excess of 30 atmospheres.

3. In a process for the hydrogenation of glycolic acid to ethylene glycol in which a substantially quantitative conversion of glycolic acid is obtained, the step which comprises hydrogenating the glycolic acid, in aqueous solution, while in direct contact with ruthenium as the hydrogenation catalyst at a temperature between 140 to 160° C. and under a pressure in excess of 30 atmospheres.

4. In a process for the hydrogenation of glycolic acid to ethylene glycol in which a substantially quantitative conversion of glycolic acid is obtained, the step which comprises hydrogenating the glycolic acid while in direct contact with ruthenium as the hydrogenation catalyst at a temperature between 145 and 149° C. under a pressure between 700 and 775 atmospheres.

5. In a process for the hydrogenation of glycolic acid to ethylene glycol in which a substantially quantitative conversion of glycolic acid is obtained, the step which comprises hydrogenating the glycolic acid while in aqueous solution and in direct contact with ruthenium as the hydrogenation catalyst at a temperature between 145 and 149° C. under a pressure between 700 and 775 atmospheres.

6. In a process for the hydrogenation of glycolic acid to ethylene glycol in which a substantially quantitative conversion of glycolic acid is obtained, the step which comprises hydrogenating technical grade glycolic acid, obtained by the reaction of formaldehyde with carbon monoxide and water, while in direct contact with ruthenium as the hydrogenation catalyst, at a temperature between 140 to 160° C. and under a pressure in excess of 30 atmospheres.

WILLIAM F. GRESHAM.

REFERENCES CITED

The following references are of record in the file of this patent:

UNITED STATES PATENTS

| Number | Name | Date |
|---|---|---|
| 2,094,611 | Lazier | Oct. 5, 1937 |
| 2,285,448 | Loder | June 9, 1942 |
| 2,305,104 | Pardee | Dec. 15, 1942 |

OTHER REFERENCES

Comptes Rendus 201, pp. 1301–1305 (1935). Article by Delepine and Horeau.

Sci. Reports Moscow State Univ., 1936 No. 6, pp. 347–352. (Article by Borisov and Stepanov.) (Abstracted in Chemical Abstracts, vol. 32, (1938) p. 2414.)